United States Patent
Namba et al.

(10) Patent No.: US 10,693,160 B2
(45) Date of Patent: Jun. 23, 2020

(54) FUEL CELL SYSTEM AND METHOD OF CONTROLLING THE SAME

(71) Applicant: TOYOTA JIDOSHA KABUSHIKI KAISHA, Toyota-shi, Aichi-ken (JP)

(72) Inventors: Ryoichi Namba, Okazaki (JP); Tomotaka Ishikawa, Nagoya (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 16/142,624

(22) Filed: Sep. 26, 2018

(65) Prior Publication Data
US 2019/0140294 A1 May 9, 2019

(30) Foreign Application Priority Data
Nov. 9, 2017 (JP) ................. 2017-216002

(51) Int. Cl.
| | |
|---|---|
| H01M 8/04746 | (2016.01) |
| H01M 8/04537 | (2016.01) |
| H01M 16/00 | (2006.01) |
| H01M 8/04111 | (2016.01) |
| H01M 8/04089 | (2016.01) |
| H01M 8/043 | (2016.01) |

(52) U.S. Cl.
CPC ....... *H01M 8/04753* (2013.01); *H01M 8/043* (2016.02); *H01M 8/04089* (2013.01); *H01M 8/04111* (2013.01); *H01M 8/04559* (2013.01); *H01M 16/006* (2013.01)

(58) Field of Classification Search
CPC ............. H01M 8/04753; H01M 8/043; H01M 8/04089; H01M 8/04111; H01M 8/04559
See application file for complete search history.

(56) References Cited

U.S. PATENT DOCUMENTS

| | | | |
|---|---|---|---|
| 2015/0004508 A1* | 1/2015 | Sato ................. | H01M 8/04089 429/432 |
| 2015/0171444 A1 | 6/2015 | Tanaka | |
| 2016/0133965 A1* | 5/2016 | Imanishi ........... | H01M 8/04089 429/9 |

FOREIGN PATENT DOCUMENTS

| | | |
|---|---|---|
| EP | 3 021 403 A1 | 5/2016 |
| JP | 2012-089523 | 5/2012 |
| JP | 2012-134166 | 7/2012 |
| JP | 2013-105534 | 5/2013 |
| JP | 5783324 B2 | 7/2015 |
| JP | 2016-136496 | 7/2016 |

* cited by examiner

*Primary Examiner* — Jimmy Vo
(74) *Attorney, Agent, or Firm* — Finnegan, Henderson, Farabow, Garrett & Dunner, LLP

(57) ABSTRACT

A fuel cell system includes a fuel cell stack, a compressor that supplies cathode gas to the fuel cell stack, and a controller that controls constituent components of the fuel cell system including the compressor. The controller controls the compressor, such that a supply period in which the compressor supplies the cathode gas and a stop period in which supply of the cathode gas is stopped appear alternately, when the fuel cell stack is not required to generate electric power, and the supply period is longer than the stop period, and such that the flow rate of the cathode gas supplied by the compressor in the supply period is smaller than the flow rate in the case where the fuel cell stack is required to generate electric power.

5 Claims, 4 Drawing Sheets

FUEL CELL SYSTEM AND METHOD OF CONTROLLING THE SAME

INCORPORATION BY REFERENCE

The disclosure of Japanese Patent Application No. 2017-216002 filed on Nov. 9, 2017 including the specification, drawings and abstract is incorporated herein by reference in its entirety.

BACKGROUND

1. Technical Field

The disclosure relates to a fuel cell system and a method of controlling the fuel cell system.

2. Description of Related Art

In a fuel cell system as described in, for example, Japanese Unexamined Patent Application Publication No. 2012-89523 (JP 2012-89523 A), in a condition where electric power generation is stopped in a fuel cell stack, cathode gas is intermittently supplied to the fuel cell stack, even during stop of power generation, so as to prevent the fuel cell stack from being unable to quickly respond to a request to generate electric power. In this manner, the voltage of a unit cell (which will be called "cell voltage") is kept equal to or larger than a given value.

Furthermore, in the system of JP 2012-89523 A, air is intermittently supplied from an air compressor to the fuel cell stack, in the condition where power generation is stopped in the fuel cell stack, so as to prevent the maximum cell voltage from exceeding an upper-limit voltage, and curb deterioration of the fuel cell stack.

SUMMARY

However, the inventor of this application found that, in the system described in JP 2012-89523 A, a length of time for which air is not supplied by the air compressor is longer than a length of time for which air is supplied by the air compressor, and the amount of air supplied during operation of the air compressor is larger than a necessary amount, resulting in a large variation in the cell voltage. When the cell voltage is large, a catalyst in the fuel cell stack may deteriorate. When the cell voltage is small, the fuel cell stack may not be able to quickly respond to a request to generate electric power.

A first aspect of the disclosure is concerned with a fuel cell system including a fuel cell stack, a compressor that supplies cathode gas to the fuel cell stack, and a controller configured to control constituent components of the fuel cell system including the compressor. The controller is configured to control the compressor, such that a supply period in which the compressor supplies the cathode gas and a stop period in which supply of the cathode gas is stopped appear alternately, when the fuel cell stack is not required to generate electric power. The controller is configured to control the compressor, such that the supply period is longer than the stop period, and a flow rate of the cathode gas supplied by the compressor in the supply period is smaller than a flow rate in the case where the fuel cell stack is required to generate electric power. In the fuel cell system of this aspect, the amount of variation in the voltage of the cell stack can be reduced, so that deterioration of a catalyst in the fuel cell stack can be curbed, and the fuel cell stack can quickly respond to a request to generate electric power.

The fuel cell system may further include a secondary battery. The controller may be configured to charge the secondary battery with regenerative power generated when driving of the compressor is stopped, at a time of switching from the supply period to the stop period. With the fuel cell system thus configured, the fuel efficiency is improved.

The fuel cell system may further include a voltage detector that detects a voltage of the fuel cell stack. The controller may be configured to control the compressor, such that the compressor supplies the cathode gas when the voltage of the fuel cell stack is smaller than a predetermined voltage, and stops supply of the cathode gas when the voltage of the fuel cell stack is larger than the predetermined voltage. In this fuel cell system, the compressor is controlled, on the basis of a predetermined one voltage; therefore, control can be simplified.

The compressor may be a turbo air compressor. The turbo air compressor consumes a smaller amount of electric power at the start of operation, and has better response, as compared with other air compressors. Thus, according to the fuel cell system, the supply period and the stop period can be quickly switched to each other, and the power consumption can be reduced, resulting in improved fuel efficiency.

A second aspect of the present disclosure relates to a method of controlling a fuel cell system including a fuel cell stack, and a compressor that supplies cathode gas to the fuel cell stack. The method includes: controlling the compressor, such that a supply period in which the compressor supplies the cathode gas and a stop period in which supply of the cathode gas is stopped appear alternately, when the fuel cell stack is not required to generate electric power, and controlling the compressor, such that the supply period is longer than the stop period, and a flow rate of the cathode gas supplied by the compressor in the supply period is smaller than a flow rate in a case where the fuel cell stack is required to generate electric power.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
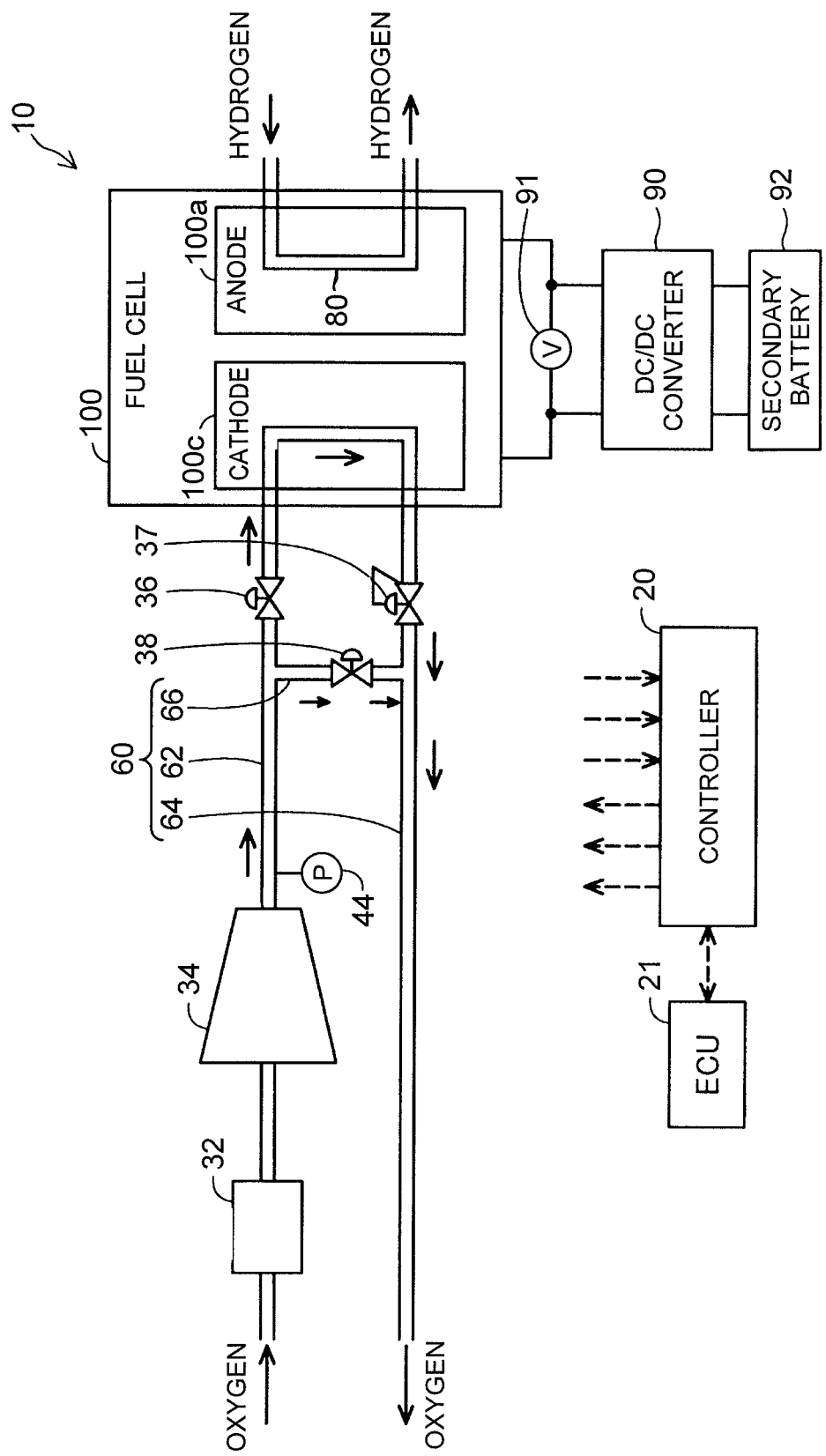
FIG. 1 is a schematic view showing a fuel cell system as one embodiment of the disclosure.

FIG. 1 shows a fuel cell system 10 as one embodiment of the disclosure. The fuel cell system 10 is installed on a fuel cell vehicle, for example. In this embodiment, the fuel cell system 10 includes a fuel cell stack 100, controller 20, air flow meter 32, compressor 34, cathode gas passage 60, and anode gas passage 80.

The fuel cell stack 100 is a polymer electrolyte fuel cell that is supplied with anode gas (e.g., hydrogen gas) and cathode gas (e.g., air) as reaction gases, to generate electric power. The fuel cell stack 100 is composed of a plurality of unit cells (not shown) stacked together. The anode gas is supplied from an anode gas tank (not shown), and passes through the anode gas passage 80, to be supplied to an anode 100a of the fuel cell stack 100 and used for electrochemical reaction. A portion of the anode gas which was not used for electrochemical reaction is discharged as offgas to the outside of the fuel cell stack 100. On the other hand, the cathode gas is supplied to a cathode 100c of the fuel cell stack 100, through the cathode gas passage 60, and used for electrochemical reaction. Oxygen that was not used for electrochemical reaction is discharged as offgas to the outside of the fuel cell stack 100.

Through the cathode gas passage 60, the cathode gas is supplied to and discharged from the fuel cell stack 100. The cathode gas passage 60 includes a cathode gas supply passage 62 through which the cathode gas is supplied to the fuel cell stack 100, a cathode gas discharge passage 64 through which the cathode gas is discharged from the fuel cell stack 100, and a bypass passage 66 that communicates with the cathode gas supply passage 62 and the cathode gas discharge passage 64.

The air flow meter 32, compressor 34, and a pressure gauge 44 are provided, in this order as viewed from the upstream side, in the cathode gas supply passage 62. The air flow meter 32 is a device that measures the flow rate of cathode gas taken into the cathode gas supply passage 62. The pressure gauge 44 measures the pressure at the downstream side of the compressor 34. In this embodiment, the pressure gauge 44 is provided upstream of a portion of the cathode gas supply passage 62 connected to the bypass passage 66, and downstream of the compressor 34. However, the pressure gauge 44 may be provided downstream of the fuel cell stack 100, in a portion of the cathode gas discharge passage 64 which is on the upstream side of its portion connected to the bypass passage 66.

The compressor 34 is a member that supplies cathode gas to the fuel cell stack 100. In this embodiment, a turbo air compressor is used as the compressor 34. The turbo air compressor is characterized in that electric power consumption at the start of operation is smaller than those of other air compressors, and the compressor operates quickly to change its rotational speed. In this connection, a volume compressor, for example, may also be used as the compressor 34.

A plurality of valves is provided in the cathode gas passage 60. In this embodiment, a shut valve 36, pressure regulating valve 37, and bypass valve 38 are provided in the cathode gas passage 60. The shut valve 36 controls the amount of cathode gas that enters the fuel cell stack 100. The shut valve 36 is provided in the cathode gas supply passage 62, and is located downstream of its portion connected to the bypass passage 66, and upstream of the fuel cell stack 100. The pressure regulating valve 37 controls the pressure of the cathode gas at the downstream side of the fuel cell stack 100. The pressure regulating valve 37 is provided in the cathode gas discharge passage 64, and is located upstream of its portion connected to the bypass passage 66, and downstream of the fuel cell stack 100. The bypass valve 38 is provided in the bypass passage 66, for controlling the amount of cathode gap that passes the bypass passage 66.

Electric power generated by the fuel cell stack 100 is stored in a secondary battery 92 via a DC/DC converter 90. Various loads (not shown) are connected to a power supply circuit including the fuel cell stack 100, DC/DC converter 90, and secondary battery 92. The fuel cell stack 100 and the secondary battery 92 can also supply electric power to the compressor 34 and various valves.

A voltage detector 91 detects the voltage (which will also be called "FC voltage") of the fuel cell stack 100. In this embodiment, the average cell voltage is used as the FC voltage. The "average cell voltage" is a value obtained by dividing a voltage across the opposite ends of the fuel cell stack 100 by the number of unit cells.

The controller 20 is configured as a computer including a central processing unit (CPU), a memory, and an interface circuit to which the above components are connected. The controller 20 outputs signals for controlling start and stop of constituent components in the fuel cell system 10, according to commands of an electronic control unit (ECU) 21. The ECU 21 is a controller that controls the whole system including the fuel cell system 10. For example, in the fuel cell vehicle, the ECU 21 performs control of the vehicle, according to a plurality of input values, such as the amount of depression of an accelerator pedal, the amount of depression of a brake pedal, and the vehicle speed. The ECU 21 may be included as a part of the functions of the controller 20. The CPU executes control programs stored in the memory, so as to control power generation by the fuel cell system 10, and implement cathode-gas intermittent supply control that will be described later.

The controller 20 switches the operating mode of the fuel cell stack 100 between a normal operating mode and a zero required output operating mode, for example. In the normal operating mode, the fuel cell system 10 receives a power generation request from the ECU 21, and the fuel cell system 10 performs operation according to the required electric power. In the zero required output operating mode, the electric power which the ECU 21 requires the fuel cell system 10 to generate is equal to or smaller than a predetermined value, and the fuel cell stack 100 is not required to generate electric power. The controller 20 switches the operating mode of the fuel cell system 10, from the normal operating mode to the zero required output operating mode, at the time of stop of the vehicle on which the fuel cell system 10 is installed, or during low-load operation, such as during traveling at a low speed. In the zero required output operating mode, the controller 20 causes the secondary battery to supply electric power. In the zero required output operating mode, the controller 20 supplies oxygen to the fuel cell stack 100, to such an extent that the voltage of the fuel cell stack 100 falls within a predetermined range. In this connection, during operation in the zero required output operating mode, small current may be generated from the fuel cell stack 100, so as to prevent the cell voltage from being equal to an open-circuit voltage. This case is also included in the zero required output operating mode. In this embodiment, the controller 20 controls each part of the fuel cell system 10, to perform cathode-gas intermittent supply control (which will be described later), in the zero required output operating mode.

Figure 2:
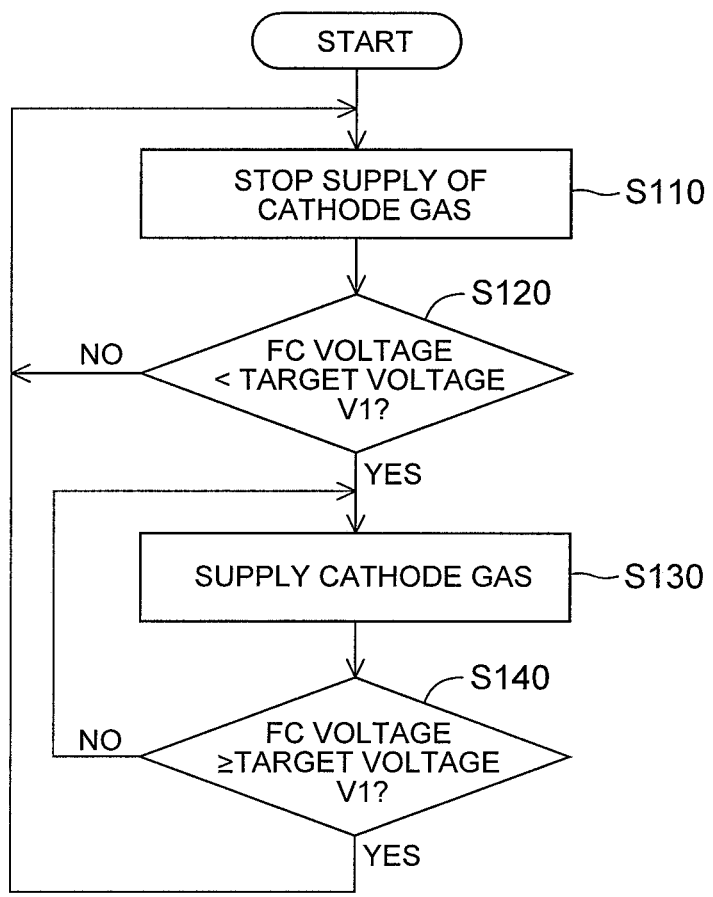
FIG. 2 is a flowchart of cathode-gas intermittent supply control executed by a controller.

FIG. 2 is a flowchart of cathode-gas intermittent supply control executed by the controller 20. When the controller 20 starts the zero required output operating mode, it starts the cathode-gas intermittent supply control. The controller 20 finishes control of FIG. 2, when it receives a command to stop operation in the zero required output operating mode, more specifically, when the ECU 21 requires the fuel cell stack 100 to generate electric power. Under the cathode-gas intermittent supply control, the controller 20 stops supply of the anode gas, and places the shut valve 36 and the pressure regulating valve 37 in open states, while placing the bypass valve 38 in a closed state.

When the cathode-gas intermittent supply control is started, the controller 20 initially stops supply of cathode gas (step S110). More specifically, the controller 20 sets the flow rate of cathode gas supplied from the compressor 34 to the fuel cell stack 100, to zero.

Then, the controller 20 determines whether the FC voltage is smaller than a target voltage V1 (step S120). The target voltage V1 is a voltage that can ensure sufficient output response, while curbing deterioration of the fuel cell stack 100, and is obtained in advance by experiment or simulation. In this embodiment, the controller 20 stores the target voltage V1 in advance. The FC voltage is detected by the voltage detector 91.

When the controller 20 determines that the FC voltage is equal to or larger than the target voltage V1 (step S120: NO), the control returns to step S110. On the other hand, when the controller 20 determines that the FC voltage is smaller than the target voltage V1 (step S120: YES), the controller 20 performs operation to supply cathode gas (step S130). More specifically, the controller 20 causes the compressor 34 to supply cathode gas to the fuel cell stack 100. In connection with the cathode-gas intermittent supply control, the period over which the controller 20 causes the compressor 34 to supply cathode gas will be called "supply period P1", and the period over which the controller 20 stops supply of cathode gas will be called "stop period P2".

The flow rate of air fed by the compressor 34 in the supply period P1 is smaller than the flow rate of air when the fuel cell stack 100 is required to generate electric power. As a result, the FC voltage can be made less likely to rise rapidly. Here, the flow rate of air can be measured by the air flow meter 32.

In this embodiment, the flow rate of air fed by the compressor 34 in the supply period P1 is equal to or larger than 0.5 NL/min., and equal to or smaller than 30 NL/min. Preferably, the flow rate is equal to or larger than 3 NL/min., and is equal to or smaller than 14 NL/min. On the other hand, in this embodiment, the flow rate of air when the fuel cell stack 100 is required to generate electric power is equal to or larger than 150 NL/min., and is equal to or smaller than 5000 NL/min. In this connection, 1 NL/min. means that air flows in an amount of 1 L per minute, under base conditions (pressure: 0.1013 MPa, temperature: 0° C., humidity: 0%).

In this embodiment, the flow rate of air fed by the compressor 34 in the supply period P1 is equal to or smaller than 1% of the maximum flow rate of air when the fuel cell stack 100 is required to generate electric power. As a result, the FC voltage can be effectively made less likely to rise rapidly, and therefore, the durability of the fuel cell stack 100 is improved.

After supply of cathode gas is started (step S130), the controller 20 determines whether the FC voltage is equal to or larger than the target voltage V1 (step S140). When the controller 20 determines that the FC voltage is smaller than the target voltage V1 (step S140: NO), the controller 20 continues supply of cathode gas (step S130). On the other hand, when the controller 20 determines that the FC voltage is equal to or larger than the target voltage V1 (step S140: YES), the control returns to step S110, and the controller 20 stops supply of cathode gas. The controller 20 repeats the above-described series of steps, until the zero required output operating mode ends.

Figure 3:
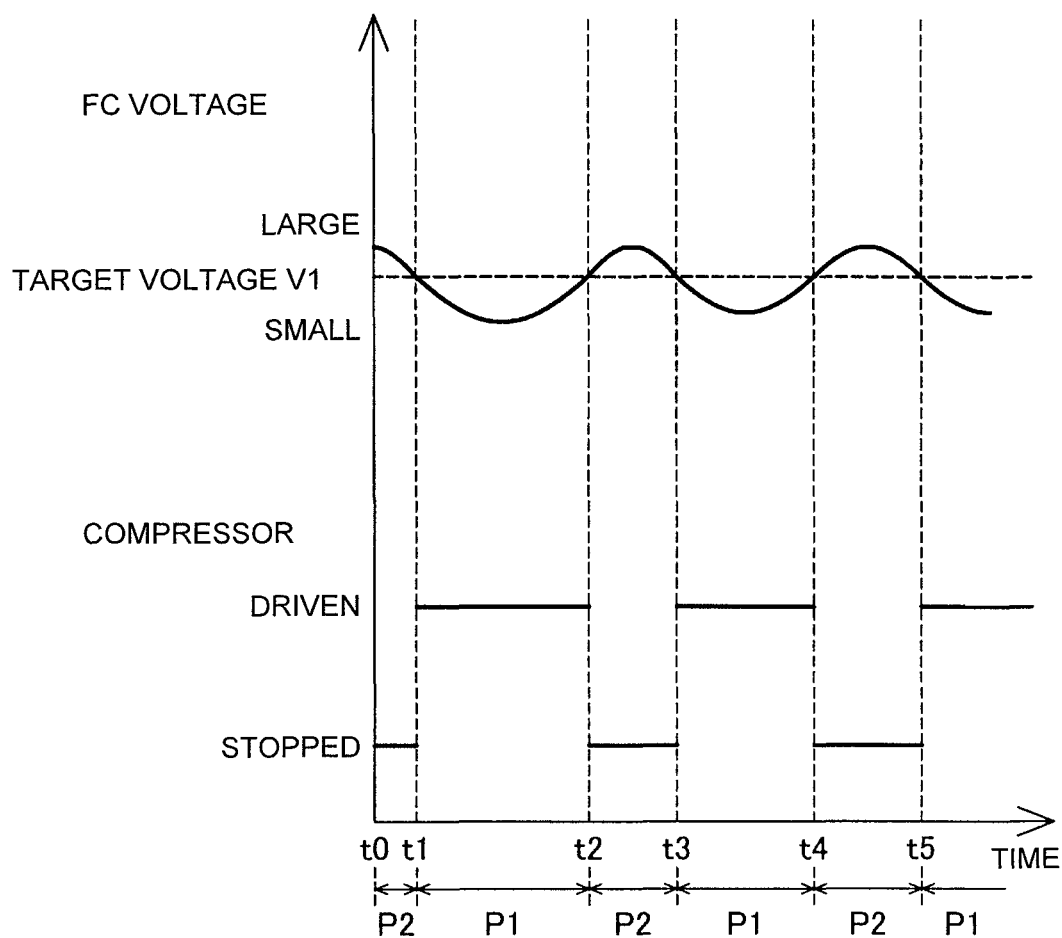
FIG. 3 is a timing chart representing the cathode-gas intermittent supply control.

The timing chart of FIG. 3 represents the cathode-gas intermittent supply control. In FIG. 3, the horizontal axis indicates time, and the vertical axis indicates change of the FC voltage in the upper section, and the driving status of the compressor 34 in the lower section. In FIG. 3, a period of a part of the cathode-gas intermittent supply control is indicated.

In this embodiment, from time t0 to time t1, the controller 20 stops supply of cathode gas to the fuel cell stack 100. Namely, the controller 20 stops the compressor 34.

Then, from time t1 to time t2, the FC voltage is smaller than the target voltage V1; therefore, the controller 20 supplies cathode gas to the fuel cell stack 100. Namely, the controller 20 drives the compressor 34. Here, the period from time t1 to time t2 is the supply period P1 in which the compressor 34 is driven.

Then, in a period from time t2 to time t3, the FC voltage is equal to or larger than the target voltage V1; therefore, the controller 20 stops supply of cathode gas to the fuel cell stack 100. Namely, the period from time t2 to time t3 is the stop period P2 in which the compressor 34 is stopped.

Similarly, a period from time t3 to time t4 is the supply period P1 in which the compressor 34 is driven, and a period from time t4 to time t5 is the stop period P2 in which the compressor 34 is stopped. In this embodiment, one cycle including one supply period P1 and one stop period P2 is equal to or longer than two seconds, and is equal to or shorter than five seconds.

As described above, in the period in which the fuel cell stack 100 is not required to generate electric power, the controller 20 controls the compressor 34 so that the supply period P1 and the stop period P2 appear alternately. Namely, the controller 20 alternately performs (or switches) supply and stop of cathode gas by the compressor 34. Also, as shown in FIG. 3, the supply period P1 is longer than the stop period P2. Before the fuel cell system 10 is brought into the status shown in FIG. 3, there may be a stop period P2 that is longer than the supply period P1. Namely, before the initial supply period P1 starts, there may be a stop period P2 that is longer than the supply period P1.

In the fuel cell system 10 of this embodiment, the supply period P1 is longer than the stop period P2, and the flow rate of air fed by the compressor 34 in the supply period P1 is smaller than the flow rate of air when the fuel cell stack 100 is required to generate electric power. Thus, according to the fuel cell system 10 of this embodiment, the rate of increase of the FC voltage that increases due to air fed by the compressor 34 can be reduced, so that the range of variation in the FC voltage can be reduced. As a result, a catalyst in the fuel cell stack 100 is less likely to deteriorate due to excessive increase of the FC voltage, and the fuel cell stack 100 can quickly respond to a request to generate electric power when there is any such request. Also, the flow rate of air fed by the compressor 34 in the supply period P1 is smaller than the flow rate of air when the fuel cell stack 100 is required to generate electric power, therefore, the fuel efficiency can be improved, as compared with the case where these flow rates are made equal to each other.

In the fuel cell system 10 of this embodiment, the supply period P1 is longer than the stop period P2. Therefore, the flowability of water vapor and water in the fuel cell stack 100 is improved, so that the environment within the fuel cell system 10 can be kept favorable.

In the fuel cell system 10 of this embodiment, the controller 20 drives the compressor 34 when the voltage of the fuel cell stack 100 is smaller than the predetermined target voltage V1, and stops the compressor 34 when the voltage of the fuel cell stack 100 is larger than the target voltage V1. While the target voltage V1 used in step S120 and the target voltage V1 used in step S140 may be set to different values, control can be simplified if the target voltage V1 used in step S120 and the target voltage V1 used in step S140 are set to the same value, as in this embodiment.

In the fuel cell system 10 of this embodiment, the turbo air compressor is used as the compressor 34. With regard to the turbo air compressor, the power consumption at the start of operation is smaller, and the response is better, as compared with other types of air compressors. Thus, according to the fuel cell system 10, the supply period P1 and the stop period P2 can be quickly switched, and the power consumption can be reduced, resulting in improved fuel efficiency.

B: Second Embodiment

The second embodiment is different from the first embodiment in that the controller 20 is configured to charge the secondary battery 92 with regenerative power generated when driving of the compressor 34 is stopped, at the time of switching from the supply period P1 to the stop period P2, but the first and second embodiments are identical with each other in other respects. According to the second embodiment, the secondary battery 92 is charged with regenerative power, so that the fuel efficiency can be improved.

C: Third Embodiment

Figure 4:
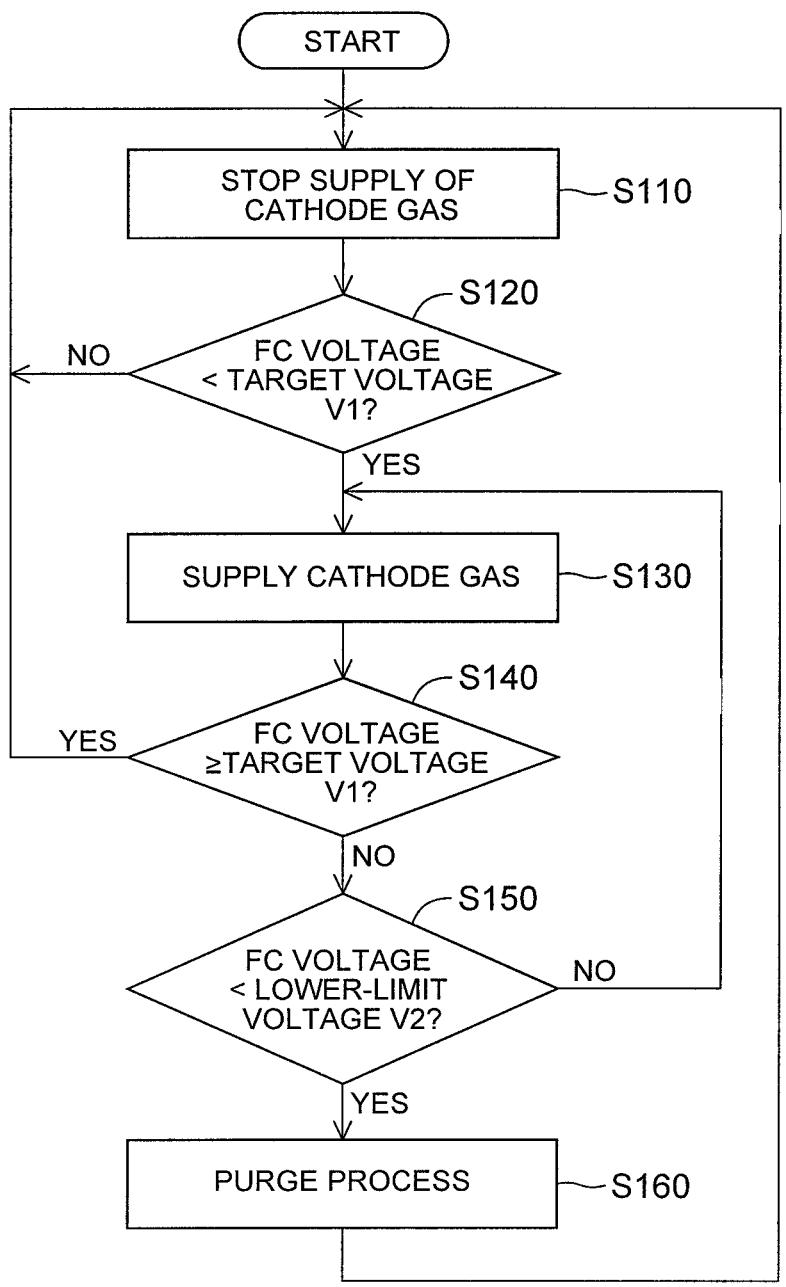
FIG. 4 is a flowchart of cathode-gas intermittent supply control according to a third embodiment.

FIG. 4 is a flowchart of cathode-gas intermittent supply control according to a third embodiment. The third embodiment is different from the first embodiment in step S150 and step S160, but is identical with the first embodiment in other respects.

In the third embodiment, when the controller 20 determines that the FC voltage is smaller than the target voltage V1 (step S140: NO), the controller 20 determines whether the FC voltage is smaller than a lower-limit voltage V2 (step S150). The lower-limit voltage V2 is a voltage at which the catalyst included in the fuel cell stack 100 switches between oxidation reaction and reduction reaction, for example, and is obtained in advance by experiment or simulation. In this embodiment, the controller 20 stores the lower-limit voltage V2 in advance. In this embodiment, the lower-limit voltage V2 is smaller than the target voltage V1.

When the controller 20 determines that the FC voltage is equal to or larger than the lower-limit voltage V2 (step S150: NO), the controller 20 continues supply of cathode gas (step S130). On the other hand, when the controller 20 determines that the FC voltage is smaller than the lower-limit voltage V2 (step S150: YES), the controller 20 performs a purge process (step S160). After the purge process (step S160), the control returns to step S110. Here, the purge process is performed so as to reduce water that exists in the cathode gas passage 60 within the fuel cell stack 100. In this embodiment, the air is supplied from the compressor 34 to the fuel cell stack 100, at a flow rate that is 10 times as large as the flow rate of air fed by the compressor 34 in the supply period P1. In this embodiment, the purge process is performed for several seconds.

In the third embodiment, the purge process makes it possible to recover the FC voltage reduced due to water that exists in the cathode gas passage 60 within the fuel cell stack 100.

The present disclosure is not limited to the above embodiments, but may be implemented with various configurations, without departing from the scope thereof. For example, technical features in the embodiments, which correspond to technical features described in "SUMMARY", may be replaced with other features or combined as appropriate, so as to solve a part or the whole of the problems mentioned above, or achieve a part or the whole of the effects mentioned above. If there is any technical feature that is not described as being essential in this specification, the technical feature may be deleted as appropriate.

What is claimed is:

1. A fuel cell system comprising:
   a fuel cell stack;
   a compressor that supplies cathode gas to the fuel cell stack; and
   a controller configured to control constituent components of the fuel cell system including the compressor,
      wherein the controller is configured to control the compressor, such that a supply period in which the compressor supplies the cathode gas and a stop period in which supply of the cathode gas is stopped appear alternately, when the fuel cell stack is not required to generate electric power, and
      the controller is configured to control the compressor, such that the supply period is longer than the stop period, and a flow rate of the cathode gas supplied by the compressor in the supply period is smaller than a flow rate in a case where the fuel cell stack is required to generate electric power.

2. The fuel cell system according to claim 1, further comprising
   a secondary battery,
   wherein the controller is configured to charge the secondary battery with regenerative power generated when driving of the compressor is stopped, at a time of switching from the supply period to the stop period.

3. The fuel cell system according to claim 1, further comprising
   a voltage detector that detects a voltage of the fuel cell stack,
   wherein the controller is configured to control the compressor, such that the compressor supplies the cathode gas when the voltage of the fuel cell stack is smaller than a predetermined voltage, and stops supply of the cathode gas when the voltage of the fuel cell stack is larger than the predetermined voltage.

4. The fuel cell system according to claim 1, wherein the compressor comprises a turbo air compressor.

5. A method of controlling a fuel cell system including a fuel cell stack, and a compressor that supplies cathode gas to the fuel cell stack, the method comprising:
   controlling the compressor, such that a supply period in which the compressor supplies the cathode gas and a stop period in which supply of the cathode gas is stopped appear alternately, when the fuel cell stack is not required to generate electric power, and
   controlling the compressor, such that the supply period is longer than the stop period, and a flow rate of the cathode gas supplied by the compressor in the supply period is smaller than a flow rate in a case where the fuel cell stack is required to generate electric power.

* * * * *